United States Patent [19]
Borne

[11] 3,852,467
[45] Dec. 3, 1974

[54] ANTIINFLAMMATORY COMPOSITIONS
[75] Inventor: Ronald F. Borne, Oxford, Miss.
[73] Assignee: The University of Mississippi, University, Miss.
[22] Filed: July 24, 1973
[21] Appl. No.: 382,281

Related U.S. Application Data
[62] Division of Ser. No. 304,485, Nov. 7, 1972, Pat. No. 3,773,712.

[52] U.S. Cl. .............................................. 424/319
[51] Int. Cl. ........................................... A61k 27/00
[58] Field of Search ..................................... 424/319

[56] References Cited
UNITED STATES PATENTS
3,682,968  8/1972  Shen et al. ...................... 260/518 A

*Primary Examiner*—Stanley J. Friedman
*Attorney, Agent, or Firm*—William D. Stokes

[57] ABSTRACT

Compounds having the formula:

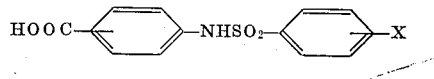

wherein X is halogen and the non-toxic, pharmaceutically-acceptable inorganic and organic salts thereof. Antiinflammatory compositions consisting essentially of at least one of said compounds in admixture with a non-toxic, pharmaceutically-acceptable carrier. A method for reducing inflammation of the tissues in mammals comprising administering a therapeutically effective concentration of at least one of said compounds, preferably in admixture with a non-toxic pharmaceutically-acceptable carrier.

26 Claims, No Drawings

ANTIINFLAMMATORY COMPOSITIONS

This is a division, of application Ser. No. 304,485, filed Nov. 7, 1972, now U.S. Pat. No. 3,773,712.

BACKGROUND OF THE INVENTION

For a considerable period of time there has been continuing interest in the discovery and development of more effective, non-steroidal, antiinflammatory agents which can be administered to mammals in therapeutically effective dosages with minimal side effects. There is also an economic need for such agents which are relatively simple to produce from readily available, non-costly reagents.

A wide variety of compounds have demonstrated antiinflammatory properties, as for example pyrazolidinediones, arylalkanoic acids, carboxylic acid amides, and salicylates. Anthranilic acid and certain of its derivatives, such as mefenamic acid, flufenamic acid, and N-benzoyl-anthranilic acid, have also exhibited antiinflammatory activity as described, for example in the article by M. W. Whitehouse, "Biochemical Properties of Anti-Inflammatory Drugs," *Biochem. Pharmacol.*, 16, pp. 753–760 (1967). The article also discloses that N-toluenesulfonyl-anthranilic is virtually inactive as an antiinflammatory agent and postulates that this inactivity may be caused by steric hindrance of the carboxyl group by the sulfono group. However none of the known art has taught or suggested the monohalogenated N-benzene sulfonyl derivatives of aminobenzoic acid, their antiinflammatory properties, or their low degree of toxicity. In light of the prior art disclosing the inactivity of a known N-sulfono derivative, the activity of the halogenated derivatives of the invention is indeed surprising.

SUMMARY OF THE INVENTION

The invention comprises new compounds having the formula:

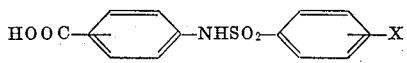

wherein X is halogen and the non-toxic, pharmaceutically-acceptable inorganic and organic salts thereof. The carboxyl substituent is preferably in the ortho position. The halogen substituent is preferably in the para position. The preferred halogen substituents are fluorine, chlorine and bromine. Of these bromine is especially preferred.

The compounds have marked antiinflammatory activity when administered to mammals and can be given in effective, non-toxic doses. The compounds are preferably administered in admixture with a non-toxic, pharmaceutically-acceptable diluent carrier.

DESCRIPTION OF PREFERRED EMBODIMENTS

The compounds are prepared as, for example, by reacting the mono-halogen substituted benzenesulfonyl chloride with aminobenzoic acid in dilute aqueous sodium hydroxide, acidifying the product, and then separating the resulting solid. Optimum yields are generally obtained when the pH of the basic solution of aminobenzoic acid is maintained between about 9.5 and 10.5 during addition of the substituted benzenesulfonyl chloride.

The salts can be formed by conventional techniques by reaction of the acid form of the compounds with a therapeutically-acceptable inorganic base, such as sodium, potassium, or ammonium hydroxide, or an organic base, such as an amine, e.g., methylamine, dimethylamine, triethylamine, ethanolamine, diethanolamine, triethanolamine, ethanol-diethylamine, or the like. Such salts are often preferred because of their greater solubility.

The compounds of the invention have been found to be effective as antiinflammatory agents in mammals and can be used to reduce inflammation and relieve pain in diseases such as arthritis. They can also be used to control and reduce edema.

Treatment is preferably by oral administration of the compound in a pharmaceutically-acceptable carrier, which may be solid or liquid. Examples of acceptable solid carriers include, but are not limited to, starch, dextrose, sucrose, lactose, gelatin, agar, stearic acid, magnesium stearate, acacia and the like. Examples of liquids include, but are not limited to, water, edible oils, such as corn or peanut oil, and the like.

When administered in solid form, the compound and diluent carrier may be in the form of tablets, capsules, powders, or lozenges prepared by standard techniques. When given as a liquid preparation, the mixture of active compound and liquid diluent carrier may be in the form of a liquid suspension administered as such or encapsulated.

The compounds have been found to be more effective as antiinflammatory agents than the standard phenylbutazone.

When employed to treat an inflammatory condition in a mammal, animal or human, the active compound is preferably administered orally in admixture with a pharmaceutically-acceptable diluent carrier as described above. The compound is administered in a non-toxic dosage concentration sufficient to reduce the inflammation or the edema where present. The actual dosage administered will be determined by such generally recognized factors as the body weight of the patient, the severity of the condition being treated, the idiosyncrasies of the particular patient, and the activity of the specific compound employed. With these considerations in mind, the daily dosage for a particular patient can be readily determined by the medical practitioner in accordance with conventional techniques in the medicinal art.

EXAMPLE 1

A solution of 0.06 mole (15.3g) of p-bromobenzenesulfonyl chloride in 20 ml of dioxane was added to a solution of 0.05 mole (6.9g) of anthranilic acid dissolved in 2N NaOH at such a rate as to maintain the pH between 9.5 and 10.5. After addition, the resulting solution was stirred until no further pH decrease was observed. The solution was then acidified with conc. Hcl to a pH of between 2 and 3 and vigorously stirred. The resulting solid was collected, dried, and recrystallized from ETOH-$H_2O$ to give an 82 percent yield of N-p-bromobenzenesulfonyl-o-aminobenzoic acid, m.p. 221°–223°C. Analysis: calc. C 43.84%, H 2.84%, N 3.93%, actual C 43.83%, H 2.78%, N 3.79%.

EXAMPLE 2

The following compounds were prepared in accordance with the procedure described in Example 1:

N-p-fluorobenzenesulfonyl-o-amino-benzoic acid:

m.p. 171–173°C.
Analysis: calc. % C 52.89, H 3.42, N 4.74
actual % C 52.87, H 3.19, N 4.45

N-p-chlorobenzenesulfonyl-o-aminobenzoic acid:

m.p. 201–203°C
Analysis: calc. % C 50.09, H 3.24, N 4.49
actual % C 50.16, H 3.17, N 4.19

The antiinflammation activity of the compounds prepared in Examples 1 and 2 were tested by two techniques, one an experimental in vitro technique described by J. H. Brown et al *Proc. Soc. Exptl. Biol. Med.*, 125, 837 (1967) and by the standard in vivo rat paw edema technique described by C. A. Winter et al. *J. Pharmacol. Exp Ther.*, 141, 369 (1963).

The in vitro technique has been employed to screen antiinflammatory compounds by determining their ability to inhibit heat-induced hemolysis of red blood cells. The procedure, as described by J. H. Brown et al, supra, was followed except that fresh human blood from fasted Type O+ donors was used rather than blood from anesthetized mongrel dogs. Fresh human blood was found to give more consistent results, possibly due to a lack of stabilizing action of the anesthetic. The compounds were tested at three dose levels and compared to the standard phenylbutazone. Each value is the average of 6 separate values determined as triplicates on the blood of 3 to 5 separate subjects. The results are summarized in Table I.

Antiinflammatory activity was measured as inhibition of carrageenin-induced edema in the hind paw of the rat (Sprague Dawley, 150–200 g) according to the procedure of Winter et al, supra. Edema formation was measured 3 hours after an intraperitoneal injection of test drug suspended in saline and Tween 60 and 2.5 hours after carrageenin injection. The edema inhibition of each compound (8 rats per group) was compared with animals receiving only the vehicle and animals receiving phenylbutazone. Each value is the average percent inhibition of paw edema measured in 16 to 24 rats. The results are summarized in Table I.

The $LD_{50}$ of the compounds was determined by the method of J. T. Litchfield et al. *J. Pharmacol. Exp. Ther.*, 96, 99 (1949) using four dose levels for each compound. Results are summarized in Table II.

It will be noted that the compounds of the invention were more effective than phenylbutazone in both the in vitro and in vivo assays. The N-p-bromobenzenesulfonyl-o-amino-benzoic acid derivative showed more than twice the potency of phenylbutazone in the in vivo assays. This compound and the fluoro derivative also exhibited lower toxicity than phenylbutazone in a significant degree.

Although this invention has been described with reference to illustrative embodiments thereof, it will be apparent to those skilled in the art that the principles of this invention can be embodied in other forms but within the scope of the claims.

I claim:

1. Antiinflammatory composition consisting essentially of a compound having the formula:

wherein X is a halogen and a non-toxic pharmaceutically-acceptable inorganic or organic salt thereof in a theropeutically effective amount, in admixture with a non-toxic, pharmaceutically-acceptable carrier.

2. The composition of claim 1 wherein the halogen is F, Cl, or Br.

3. The composition of claim 1 wherein the -COOH group is in ortho position.

4. The composition of claim 2 wherein the -COOH group is in ortho position.

5. The composition of claim 1 wherein the halogen is in para position.

6. The composition of claim 2 wherein the halogen is in para position.

7. The composition of claim 3 wherein the halogen is in para position.

8. The composition of claim 4 wherein the halogen is in para position.

9. The composition of claim 2 wherein the halogen is bromine.

10. The composition of claim 4 wherein the halogen is bromine.

11. The composition of claim 6 wherein the halogen is bromine.

12. The composition of claim 8 wherein the halogen is bromine.

13. The composition of claim 12 wherein the carrier is solid.

14. A process for reducing inflammation in mammal which comprises administering to said mammals the compositions of claim 1, said composition containing said compound in therapeutically-effective concentration.

15. The process of claim 14 wherein the halogen is F, Cl, or Br.

16. The process of claim 14 wherein the -COOH group is in ortho position.

17. The process of claim 15 wherein the -COOH group is in ortho position.

18. The process of claim 14 wherein the halogen is in para position.

TABLE I

| Compound | %Inhibition of Heat-Induced Hemolysis Conc (n)[a] | | | % Inhibition of edema Dose (n)[a] | | $LD_{50}$ (mg/kg) |
|---|---|---|---|---|---|---|
| F | 87.8(6) | 37.4(6) | 17.9(6) | 20.8(24) | 64.0(24) | 395 |
| Cl | 66.7(6) | 62.6(6) | 0 (6) | 35.0(16) | 58.15(16) | 275 |
| Br | 85.7(6) | 30.2(6) | 17.0(6) | 71.5(16) | 83.8(16) | 385 |
| Phenyl-butazone | 83.7(6) | 35.0(6) | 17.2(6) | 34. (16) | 52 (16) | 336[b] |

[a] n= No. of determinations per conc or dose level.
[b] J. Ben-bassat, E. Peretz and F. G. Sulman, Arch. Int. Phamacodyn. Ther., 122, 434 (1959).

19. The process of claim 15 wherein the halogen is in para position.

20. The process of claim 16 wherein the halogen is in para position.

21. The process of claim 17 wherein the halogen is in para position.

22. The process of claim 15 wherein the halogen is bromine.

23. The process of claim 17 wherein the halogen is bromine.

24. The process of claim 19 wherein the halogen is bromine.

25. The process of claim 21 wherein the halogen is bromine.

26. The process of claim 25 wherein the carrier is solid.

* * * * *